US011169063B2

(12) United States Patent
Okazaki et al.

(10) Patent No.: US 11,169,063 B2
(45) Date of Patent: Nov. 9, 2021

(54) DEFORMATION TESTING APPARATUS INCLUDING A DETACHABLE/ATTACHABLE TEST CARTRIDGE ARRANGED ON AN UPPER PART OF A FRAME

(71) Applicant: YUASA SYSTEM CO., LTD., Okayama (JP)

(72) Inventors: Yasuhisa Okazaki, Okayama (JP); Naotsugu Ando, Okayama (JP); Hisao Sasaki, Okayama (JP)

(73) Assignee: Yuasa System Co. Ltd., Okayama (JP)

( * ) Notice: Subject to any disclaimer, the term of this patent is extended or adjusted under 35 U.S.C. 154(b) by 139 days.

(21) Appl. No.: 16/488,853

(22) PCT Filed: Feb. 27, 2018

(86) PCT No.: PCT/JP2018/007374
§ 371 (c)(1),
(2) Date: Aug. 26, 2019

(87) PCT Pub. No.: WO2018/155723
PCT Pub. Date: Aug. 30, 2018

(65) Prior Publication Data
US 2021/0140863 A1    May 13, 2021

(30) Foreign Application Priority Data

Feb. 27, 2017 (JP) ............................. JP2017-034444

(51) Int. Cl.
*G01N 3/20* (2006.01)
*G01N 3/08* (2006.01)
(Continued)

(52) U.S. Cl.
CPC ................. *G01N 3/38* (2013.01); *G01N 3/02* (2013.01); *G01N 2203/0005* (2013.01);
(Continued)

(58) Field of Classification Search
CPC ............. G01N 3/32; G01N 2203/0005; G01N 2203/0023; G01N 2203/0282; G01N 3/38;
(Continued)

(56) References Cited

U.S. PATENT DOCUMENTS

2016/0103048 A1*    4/2016   Okazaki ................... G01N 3/20
73/853

FOREIGN PATENT DOCUMENTS

JP    2001-330541 A    11/2001
JP    2005-315691        11/2005
(Continued)

OTHER PUBLICATIONS

Notification of Opinion Submission, KR. Pat. App. No. 10-2019-7027763, Korean Patent Office, dated Nov. 24, 2020, Government Complex Daejeon Building 4, 189, Cheongsa-ro, Seo-gu, Daejeon, 35208, Republic of Korea.

*Primary Examiner* — Brandi N Hopkins
(74) *Attorney, Agent, or Firm* — Trojan Law Offices

(57) ABSTRACT

Provided is a deformation tester where a specimen is deformed and can be observed and analyzed in any deformation state without removal. The tester includes: a detachable part repeating a relative displacement cycle, two portions of the specimen attached to a first and a second attachment portion of a first and a second part member, the specimen deformed from a first to a second shape state and back to the first shape state during the cycle; and a main body part that the detachable part is detachably attached to; wherein a state retaining part for fixing a relative position of the second to the first part member in at least one shape state is freely attachable to the detachable part mounted on the main body part and the detachable part with the state retaining part is freely attachable to the main body part.

20 Claims, 11 Drawing Sheets

(51) Int. Cl.
*G01N 3/38* (2006.01)
*G01N 3/02* (2006.01)

(52) U.S. Cl.
CPC .............. *G01N 2203/005* (2013.01); *G01N 2203/0026* (2013.01); *G01N 2203/0058* (2013.01); *G01N 2203/04* (2013.01)

(58) Field of Classification Search
CPC .... G01N 3/02; G01N 2203/0026; G01N 3/20; G01N 33/46; G01N 35/02; G01N 2203/005; G01N 2203/0058; G01N 2203/04
See application file for complete search history.

(56) References Cited

FOREIGN PATENT DOCUMENTS

| | | |
|---|---|---|
| JP | 2014-025862 | 2/2014 |
| JP | 2014-074598 | 4/2014 |
| JP | 2016-080694 | 5/2016 |
| KR | 10-2012-0001003 A | 1/2012 |
| KR | 10-1489667 B | 2/2015 |

\* cited by examiner

DEFORMATION TESTING APPARATUS INCLUDING A DETACHABLE/ATTACHABLE TEST CARTRIDGE ARRANGED ON AN UPPER PART OF A FRAME

TECHNICAL FIELD

The present invention relates to a deformation tester (i.e., deformation testing apparatus) and more specifically relates to a deformation testing apparatus that tests durability of a specimen such as a thin glass plate and a resin plate to be used for a flexible display such as a substrate of a mobile phone or the like and an organic electroluminescence display or the like by deforming the specimen.

BACKGROUND ART

A deformation testing apparatus for testing durability of a specimen such as a thin glass plate and a resin plate to be used for a flexible display such as a substrate of a mobile phone or the like and an organic electroluminescence display or the like by deforming the specimen has been known before (for example, refer to Patent reference 1).

The Patent reference 1 discloses a deformation testing apparatus to be provided, wherein a folding test of a specimen can be performed with a machine, whereby enabling the machine to work with a minor adjustment even if a radius of curvature of the curve and an arc length are different' (paragraph [0005] of the Patent reference 1), and more specifically 'a folding test machine which is characterized in that a workpiece is repeatedly bent in a bow-shaped manner by moving a moveable wall closer to and farther from a fixable wall over and over where the workpiece and a plate spring other than the workpiece are held by respective holding parts on the both ends thereof so as to be bridged between the fixable wall and the moveable wall, on which the respective holding parts are provided and arranged in a rotatable manner in a vertical plane perpendicular to the fixable wall and the moveable wall, which are arranged in an opposing manner inside a frame shaped in an approximately boxed-shape' (claim 1 of the Patent reference 1). With such a deformation testing apparatus (a folding test machine in the Patent reference 1), it is described 'the workpiece such as a thin glass plate or a resin plate is bridged between the fixable wall and the moveable wall in a bow-shaped manner such that the workpiece is repeatedly bent in the bow-shaped manner. In the test, a deformation requirement such as a radius of the curved workpiece may be changed, which can be achieved by changing initial positions of both walls and a stroke length of an actuator that moves the moveable wall and so on. And the change of the stroke length may also be adopted without causing internal stress to remain inside thereof by arranging the holding parts to hold the workpiece in a rotatable manner (in a tiltable manner) in a vertical plane perpendicular to the moveable wall or the fixable wall. Further, it is also necessary to make a rate of bending or bowing adjustable, which may be achieved by changing a rate of the actuator.' (paragraph [0008] of the Paten reference 1).

PRIOR ART REFERENCE

Patent Reference

[Patent Reference 1] Japanese published unexamined patent application No. 2016-080694 (for example, Abstract, paragraphs [0001]-[0008], [0011]-[0013], FIGS. 1-3, and so on)

SUMMARY OF THE INVENTION

Problems to be Solved by the Invention

With respect to the deformation testing apparatus disclosed by the Patent reference 1, it is described that 'the workpiece 4 is bridged between the moveable wall 3 and the fixable wall 2 and is held and clamped by holding parts 5, 6 fixed to ceiling plates 22, 23 provided on their top ends (summits) of the moveable wall 3 and the fixable wall 2, respectively, with hinges 9, 10 in a rotatable manner in a vertical plane and pressing plates 7, 8 fixed to the holding parts' (paragraph [0013] of the Patent reference 1). Since it is difficult to observe or analyze a specimen as it is held by a large deformation testing apparatus once a deformation test is started after a workpiece 4 which is the specimen is held and clamped by the holding parts 5, 6 and the pressing plates 7, 8, it is necessary to remove the specimen from the deformation testing apparatus when the observation, analysis, or the like is conducted. A continuing deformation test with the same condition could not be conducted once the observation or the analysis would intervene in the deformation test since, while it is necessary to hold and clamp back the specimen having been observed or analyzed, after the observation and the analysis, between the holding parts 5, 6 and the pressing plates 7, 8, it is necessary to conduct an extremely careful and difficult operation in order to make holding conditions (a condition before removing the specimen for conducting the observation or the analysis and a condition where the specimen is held back after the observation and the analysis) identical before and after the observation and the analysis and both conditions are different even if the specimen is held back with sufficient care. Further, in a deformation test in which a specimen undergoes a predetermined deformation cycle of a first shape state to a second shape state and back to the first shape state again, even though it is desirable that the specimen deformed in any shape state during the cycle is observed or analyzed or else while the shape state of the specimen is kept, the specimen is removed from the deformation testing apparatus such that the shape state could not be retained.

Then, in the present invention, it is an object to provide a deformation testing apparatus in which the specimen can be observed or analyzed or else while the shape state of the specimen having been deformed in any shape state in the deformation test is retained and it is not necessary to remove the specimen after starting the deformation test.

Means Solving the Problem

According to a deformation testing apparatus (hereinafter referred to as "present testing apparatus") of the present invention, the present testing apparatus includes: a detachable part to repeat a displacement cycle of a relative displacement of a second part relative to a first part to make the specimen undergo a predetermined deformation cycle from a first shape state to a second shape state and back to the first shape state again while at least two different portions of the specimen are held by a first holding part of the first part and a second holding part of the second part, respectively; and a main body part in which the detachable part is held, wherein state retaining means to fix a relative position of the second part relative to the first part in at least one shape state of any shape state that the specimen could take is attachable to and detachable from the detachable part mounted to the main body part and wherein the detachable part itself to which the state retaining means is mounted is attachable to and detachable from the main body part.

The present testing apparatus is configured to include the detachable part and the main body part.

The detachable part includes the first part and the second part. At least two different portions of the specimen are held by the first holding part the first part has and the second holding part the second part has (where one portion of the at least two portions is held by the first holding part and the other portion of the at least two portions is held by the second holding part. And, since it is described "at least two portions", at least three portions of the specimen may be held in the detachable part.). And as the displacement cycle of the relative displacement of the second part relative to the first part (Three cases where only the first part is displaced while the second part remains stationary; only the second part is displaced while the first part remains stationary; and both the first and the second parts are displaced are included.) is repeated, the specimen undergoes a predetermined deformation cycle (For example, deformation such as bending, bowing, torsion, tension, compression, and so on is included.) from the first shape state to the second shape state and back to the first shape state again. The detachable part is mounted on the main body part in a detachable manner.

And, with respect to the present testing apparatus, the state retaining means is attachable to and detachable from the detachable part mounted on the main body part and the detachable part to which the state retaining means is fixed is attachable to and detachable from the main body part. Here, the state retaining means fixes the relative position of the second part relative to the first part in one shape state of any shape state that the specimen could take during the predetermined deformation cycle from the first shape state to the second shape state and back to the first shape state again.

In this way, with respect to the present testing apparatus, as the specimen is held by the first part and the second part and the displacement cycle of the second part relative to the first par is repeated, the specimen undergoes the predetermined deformation cycle such that the deformation test of the specimen can be performed. And, after the deformation test is started, when the specimen is observed or analyzed or else, the state retaining means is fixed to the detachable part mounted on the main body part. Then, the detachable part to which the state retaining means is fixed is removed from the main body part (The shape state of the specimen is retained by fixing the state retaining means thereto since the relative position of the second part relative to the first part before removal is fixed even if the detachable part is removed from the main body part.) and the specimen fixed to the detachable part can be observed and analyzed or else as in its fixed state (Since the detachable part is small and lightweight compared to the entire testing apparatus, it is easy to observe and analyze the specimen as it is fixed to the detachable part.). After the observation and the analysis or the like of the specimen, the detachable part to which the state retaining means is fixed is set to the main body part and the state retaining means is removed from the detachable part that is mounted onto the main body part. Then, the deformation test for the specimen to undergo the predetermined deformation cycle can be continued again by resuming repeating the displacement cycle of the second part relative to the first part again. In this way, in the present testing apparatus, it is not necessary to remove the specimen (the specimen is still attached to the detachable part) after the deformation test is started and the specimen can be observed or analyzed or else as the specimen is still kept in any shape state that it can take during the deformation test (The shape state of the specimen is retained by installing the state retaining means on the detachable part.).

In the present testing apparatus, the detachable part may also include a state retaining means mounting part for mounting the state retaining means.

The state retaining means may be what can fix the relative position of the second part relative to the first part in at least one shape state among any shape state that the specimen can take and is not limited to any of those, but may include, for example, that to hold the first part and the second part of the detachable part by clamping them, respectively; that to hold the first part and the second part of the detachable part by a magnet to attract them; that to hold the first part and the second part of the detachable part by fitting them from outer peripheries thereof; and so on. On the other hand, if the detachable part is adapted to have the state retaining means mounting part to hold the state retaining means, the state retaining means can be surely mounted on the detachable part. As an example of a combination of the state retaining means mounting part and the state retaining means to be held by the state retaining means mounting part, i.e., a combination of one and the other, there are cases where one is a male screw and the other is a female screw that the male screw can engage; one is a convex part to be inserted and the other is a concave part into which the convex part is inserted; one is a hook-and-loop fastener and the other is another hook-and-loop fastener to be engageable with the hook-and-loop fastener; and so on.

With respect to the present testing apparatus, when the first shape state shifts to the second shape state, the distance between the first part and the second part is reduced and the detachable part includes biasing means to bias the first part and/or the second part such that the distance is so increased as the second shape state shifts to the first shape, and the state retaining means may be means for preventing the distance from increasing that is to prevent the distance from increasing (hereinafter referred to as "distance increasing prevention testing apparatus").

In a shifting process from the first shape state to the second shape state of the specimen according to the predetermined deformation cycle, in the case where the distance between the first part and the second part is reduced, the detachable part has the biasing means and the biasing means biases the first part and/or the second part such that the distance between the first part and the second part is increased as the second shape state shifts to the first shape state and the state retaining means may be easily configured since the state retaining means, which is assumed to be the means for preventing the distance from increasing, only has to regulate the displacement of the first part and/or the second part in the direction where the means for preventing the distance from increasing that is the state retaining means prevents the distance from increasing.

In the present testing apparatus, when the first shape state shifts to the second shape state, the distance between the first part and the second part is increased and the detachable part may have biasing means to bias the first part and/or the second part such that the distance is reduced as the second shape state shifts to the first shape state and the state retaining means may be the means for preventing the distance from decreasing (hereinafter referred to as "distance decreasing prevention testing apparatus").

In the shifting process from the first shape state to the second shape state of the specimen according to the predetermined deformation cycle, in the case where the distance between the first part and the second part is increased, the detachable part has the biasing means and the biasing means biases the first part and/or the second part such that the distance is reduced as the second shape state shifts to the first shape state and the state retaining means may be easily configured since the state retaining means, which is assumed to be the means for preventing the distance from reducing, only has to regulate the displacement of the first part and/or the second part in the direction where the means for preventing the distance from reducing that is the state retaining means prevents the distance from reducing.

In the distance increasing prevention testing apparatus or the distance decreasing prevention testing apparatus, the state retaining means may be configured to include a state retaining member having one end that is mounted on the first part and the other end that is mounted on the second part, a detachable part-on-one-end-side to fasten detachably the one end side of the state retaining member to the first part, and a detachable part-on-the-other-end-side to fasten detachably the other end side of the state retaining member to the second part.

In this way, the one end side of the state retaining member is fastened detachably to the first part by the detachable part-on-one-end-side and the other end side of the state retaining member is fastened detachably to the second part by the detachable part-on-one-end-side such that the state retaining member is fastened detachably on the one end side to the first part and is fastened detachably on the other end side to the second part such that the means for preventing the distance from increasing (in the case of the distance increasing prevention testing apparatus) or the means for preventing the distance from decreasing (in the case of the distance decreasing prevention testing apparatus) that is the state retaining means can be easily configured.

In the present testing apparatus, the state retaining means may be what can fix the relative position of the second part relative to the first part in every shape state of any shape state that the specimen can take.

In this way, the relative position of the second part relative to the first part in every shape state of any shape state that the specimen can take can be fixed such that, after starting the deformation test, the specimen can be observed and analyzed or else as it is kept in the shape state of any shape state that the specimen can take.

In the present testing apparatus, when the detachable part is mounted on the main body part, it may be configured that the detachable part can be removed from the main body part by moving the detachable part in a predetermined direction relative to the main body part, while the detachable part is prevented from being moved in an opposite direction to the predetermined direction relative to the main body part as the detachable part hits the main body part and the detachable part is prevented from being moved in any direction existing in a plane perpendicular to the predetermined direction (hereinafter, referred to as a "detachable direction regulated testing apparatus").

In this way, in a state where the detachable part is mounted on the main body part (hereinafter, referred to as a "mounted state"), the detachable part can be removed from the main body part by moving the detachable part in the predetermined direction (hereinafter, referred to as a "removing direction") relative to the main body part. However, in the mounted state, the detachable part is prohibited from being moved in the opposite direction to the predetermined direction (removing direction) relative to the main body part by abutting of the detachable part and the main body part. And, in the mounted state, the detachable part is prohibited from being moved in any direction along the plane perpendicular to the predetermined direction (removing direction) by abutting of the detachable part and the main body part. Hence, in the mounted state, the detachable part can be moved in the predetermined direction (removing direction) so as to be removed, but the detachable part is prohibited from being moved in any other direction than the predetermined direction (removing direction) such that the mounted state where the detachable part is mounted on the main body part can be easily retained. And both the positioning of the detachable part along the perpendicular plane relative to the main body part (an orthographic projection of the detachable part on the perpendicular plane is determined to be positioned at a predetermined position relative to an orthographic projection of the main body part on the perpendicular plane) and the positioning of the detachable part relative to the main body part along the predetermined direction (removing direction) can be easily and surely performed by moving the detachable part having been removed from the main body part in the opposite direction to the predetermined direction (removing direction) relative to the main body part.

In the detachable direction regulated testing apparatus, movement regulating means that regulates the movement of the detachable part relative to the main body part in the predetermined direction may be comprised (hereinafter, referred to as a "removing direction movement regulating testing apparatus").

In this way, the movement regulating means regulates the detachable part set in the mounted state where the detachable part is mounted on the main body part from being moved in the predetermined direction (removing direction) such that the detachable part may be prevented from falling out or else from the main body part unexpectedly or may be made less likely to fall or else out of the main body part. Here, the regulation of movement of the detachable part in the predetermined direction relative to the main body part includes not only that the movement of the detachable part in the predetermined direction relative to the main body part is completely prevented, but also that the movement of the detachable part in the predetermined direction relative to the main body part is prevented such that the detachable part may not be moved out of the main body part, but may be moved to some extent.

With respect to the removing direction movement regulating testing apparatus, the movement regulating means may include at least one of the gravity force of the detachable part when the opposite direction to the predetermined direction has an component of the gravity force in the vertical direction and magnetic force generation means provided to either the detachable part or the main body part so as to attract the other part.

The movement regulating means may be what regulates the detachable part in the mounted state from moving in the predetermined direction (removing direction) relative to the main body part and may be exemplified by, for example, a combination of a pin to engage with the detachable part and the main body part and an insertion hole into which the pin is inserted; a pair of hook-and-loop fasteners to engage with each other provided to the detachable part and the main body part; a combination of a male screw to engage with the detachable part and the main body part and a female screw to engage with the male screw; a connection belt to link the detachable part and the main body part; and so on, wherein the present testing apparatus may be easily and compactly configured since a special configuration is not necessary if the movement regulating means is the gravity force of the detachable part when the opposite direction to the predetermined direction (removing direction) has a component of vertically downward direction (that is, the center of gravity of the detachable part is lowered by the movement of the detachable part in the opposite direction to the predetermined direction (removing direction)), and wherein the detachable part and the main body part should attract mutually without any special operation when they get closer with each other if the movement regulating means is the magnetic force generation means (for example, a permanent magnet and an electric magnet) provided to either one of the detachable part and the main body part to attract the other part. And the movement regulating means may include both the gravity force of the detachable part and the magnetic force generation means.

With respect to the detachable direction regulated testing apparatus, either one of the detachable part and the main body part may have a projection member sticking out in the predetermined direction or the opposite direction thereto and the other than the either one may have an insertion hole into which the projection member is inserted in the predetermined direction or the opposite direction thereto.

In this way, either one of the detachable part and the main body part has the projection member sticking out in the predetermined direction (the either one is the main body part) or in the opposite direction thereto (the either one is the detachable part) and the other than the either one has the insertion hole into which the projection member is inserted in the predetermined direction (the other is the detachable part) or in the opposite direction thereto (the other is the main body part) such that the detachable part may be removed from the main body part by moving the detachable part having been in the mounted state in the predetermined direction relative to the main body part as it is a simple configuration with the projection member and the insertion hole into which the projection member is inserted, and the detachable part may be prevented from being moved in any direction along the perpendicular plane to the predetermined direction in the mounted state relative to the main body part (For example, an outer face of the projection member and an inner face of the insertion hole hit each other even if the detachable part moves in the any direction relative to the main body part.).

With the present testing apparatus, the main body part may include a first holding member to hold the first part; a second holding member to hold the second part; and driving means to displace the first part and the second part relatively and repeatedly as the displacement cycle is repeated with respect to the first part held by the first holding member and the second part held by the second holding member.

In this way, the main body part includes the first holding member, the second holding member, and the driving means, and the driving means displace the first holding member holding the first part and the second holding member holding the second part relatively and repeatedly such that the first part and the second part repeat the displacement cycle. The driving means to displace the first part and the second part relatively often occupies a relatively large ratio with respect to the weight and/or the volume of the present testing apparatus such that the detachable part may be configured so small and so light such that the driving means is included in the main body part, but not in the detachable part so that the specimen can be easily observed or analyzed or else by removing the detachable part from the main body part.

With respect to the main body part, the detachable part, and the state retaining means in the present testing apparatus, various kinds of modifications thereof may be made in accordance with the object of the test and the specification and so on such that various kinds of main body parts, detachable parts, and state retaining means thereof may be prepared (manufactured and ready for sale) beforehand such that each of main body parts, detachable parts, and state retaining means thereof may be combined such that a combination thereof may match the object of the test and the specification and so on well.

EMBODIMENT FOR CARRYING OUT THE INVENTION

In the following, embodiments of the present invention are explained with reference to the drawings. However, these should not limit any of the present invention.

Figure 1:
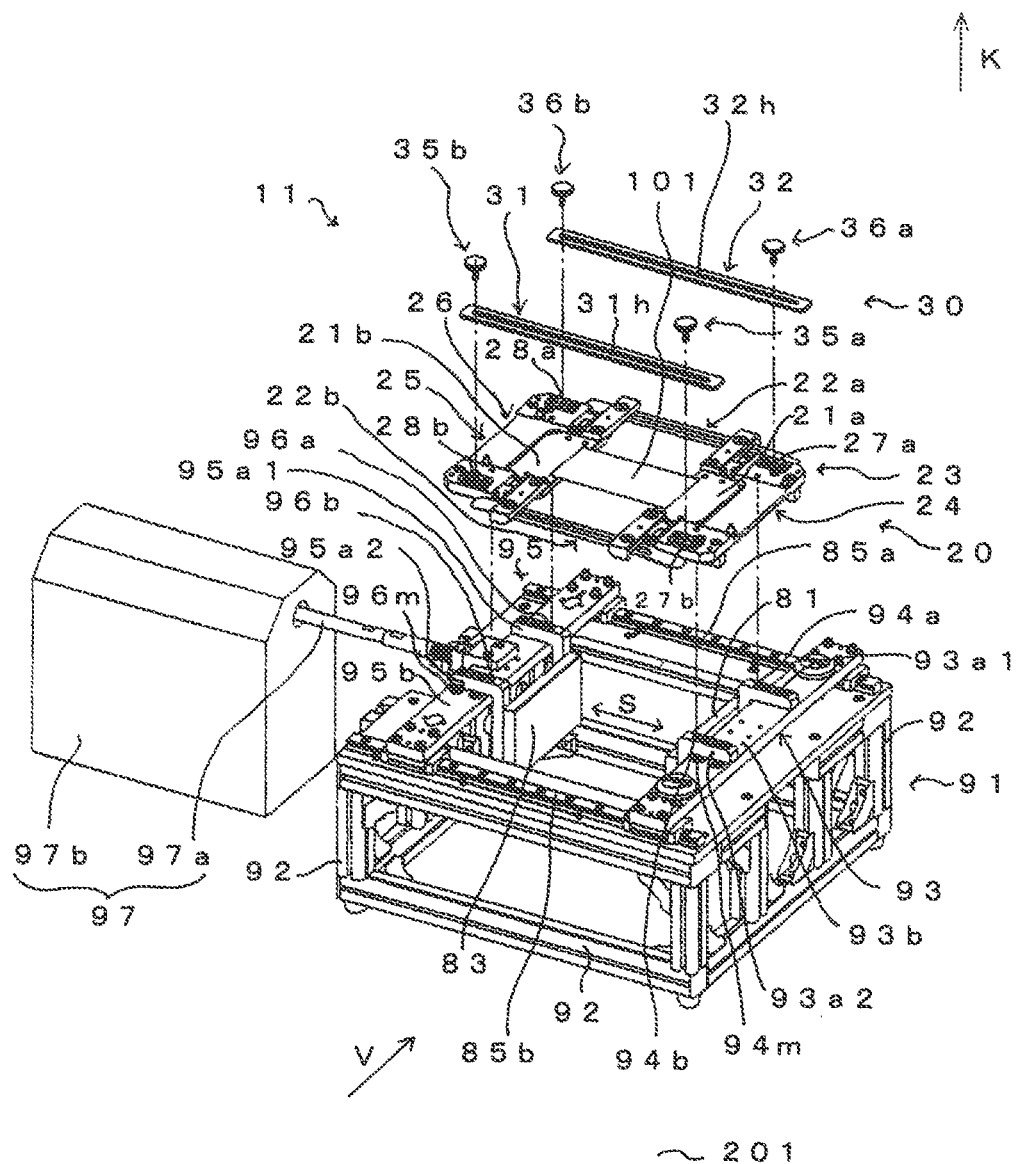
FIG. 1 shows an exploded perspective view illustrating a deformation testing apparatus (present testing apparatus) of an embodiment of the present invention.
Figure 2:
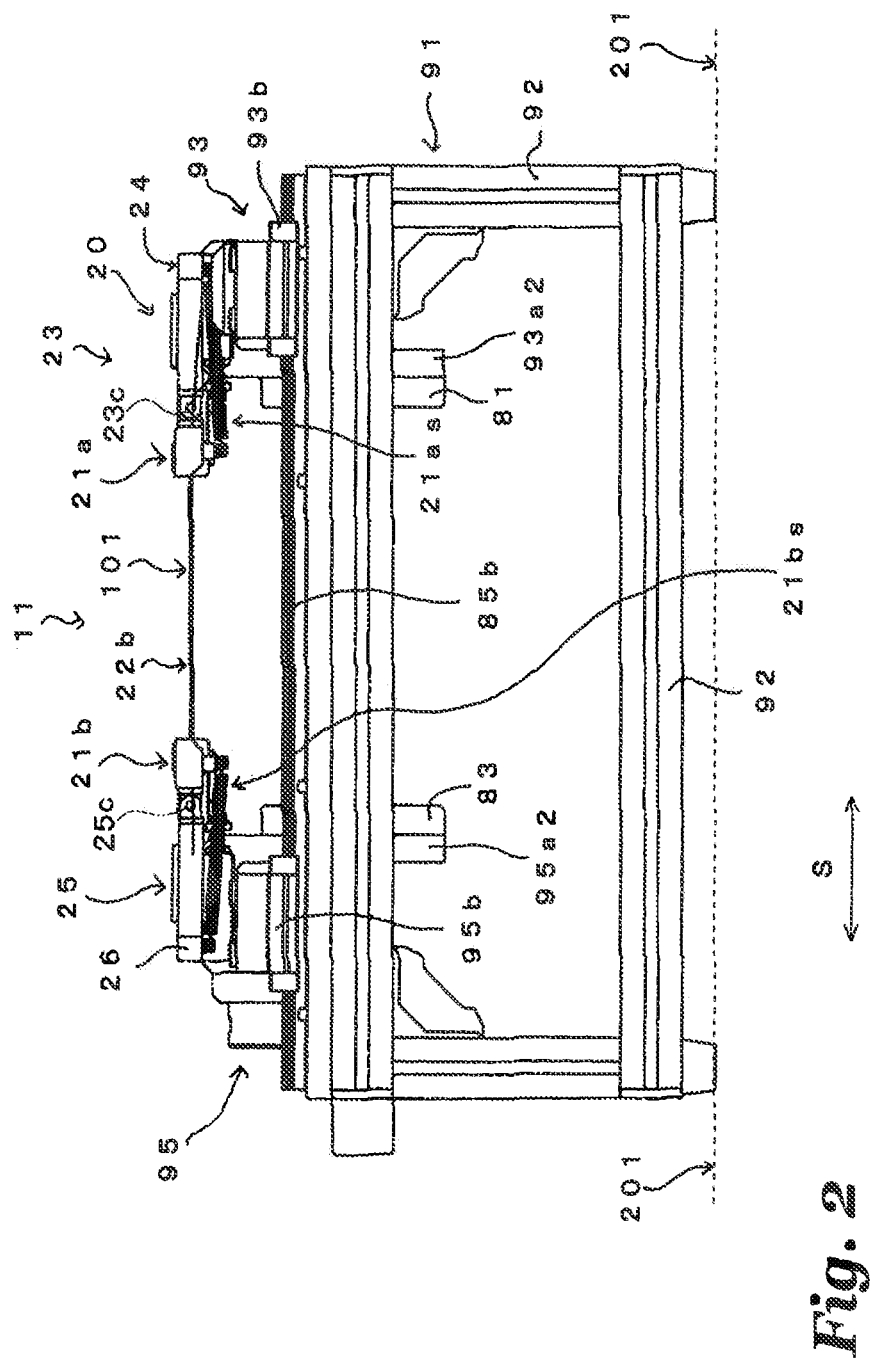
FIG. 2 shows a front view of the present testing apparatus.
Figure 3:
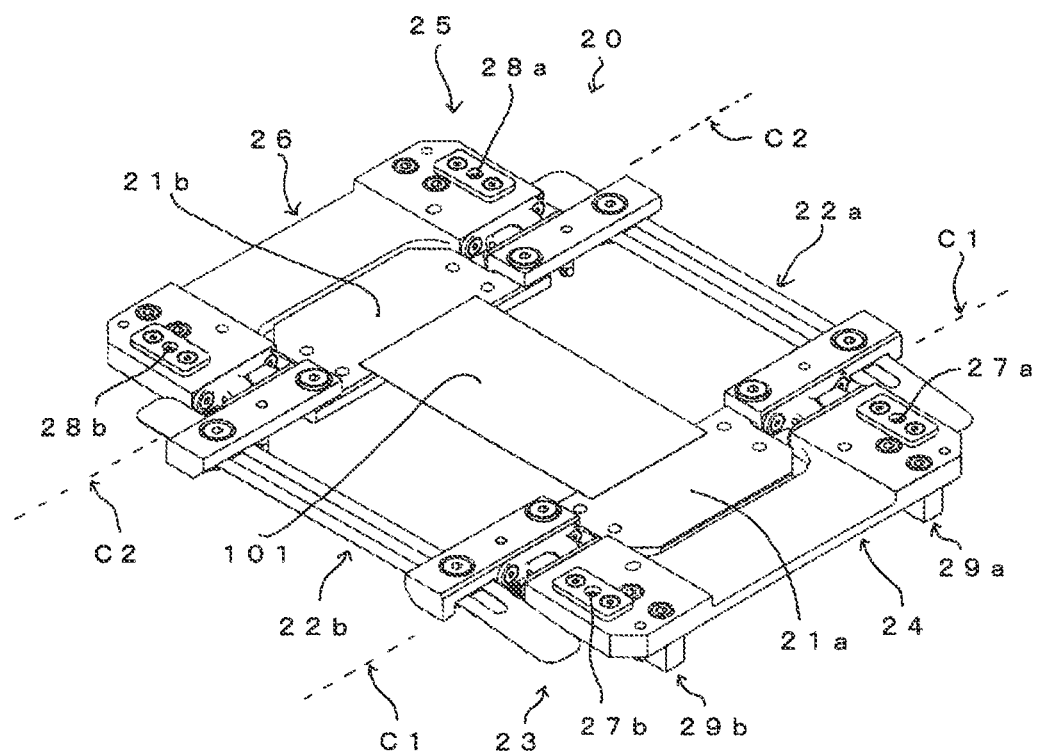
FIG. 3 shows an enlarged perspective view of a test cartridge.
Figure 4A:
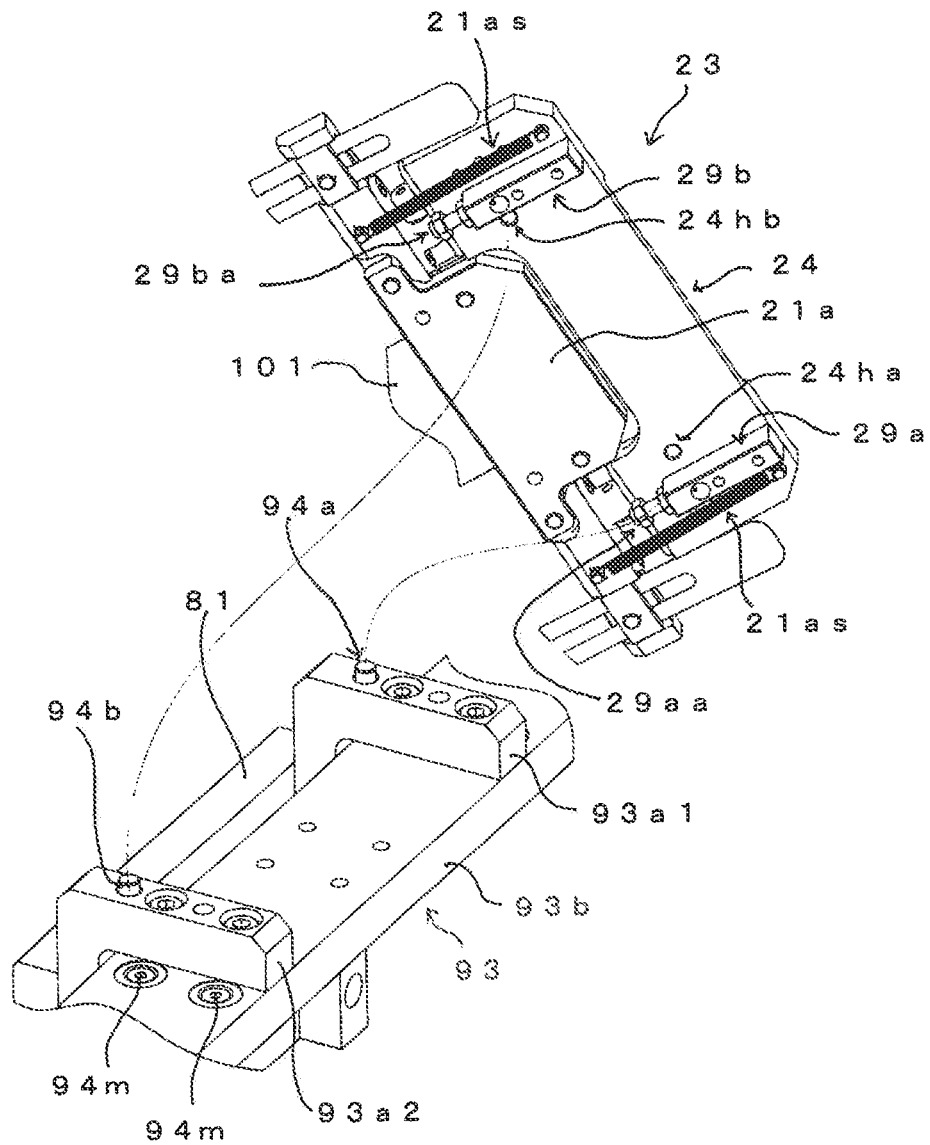
FIG. 4A shows a partial enlarged exploded perspective view illustrating a relationship of a first main body, an insertion pin, and a permanent magnet.
Figure 4B:
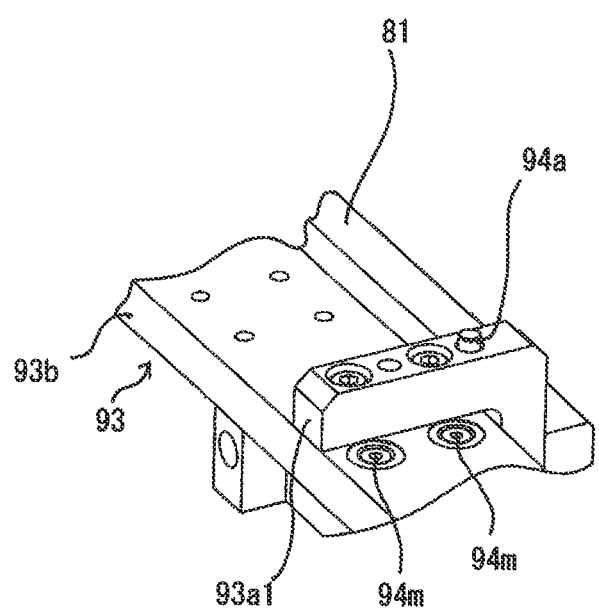
FIG. 4B shows a partial enlarged exploded perspective view illustrating the relationship of the first main body, the insertion pin, and the permanent magnet.
Figure 4C:
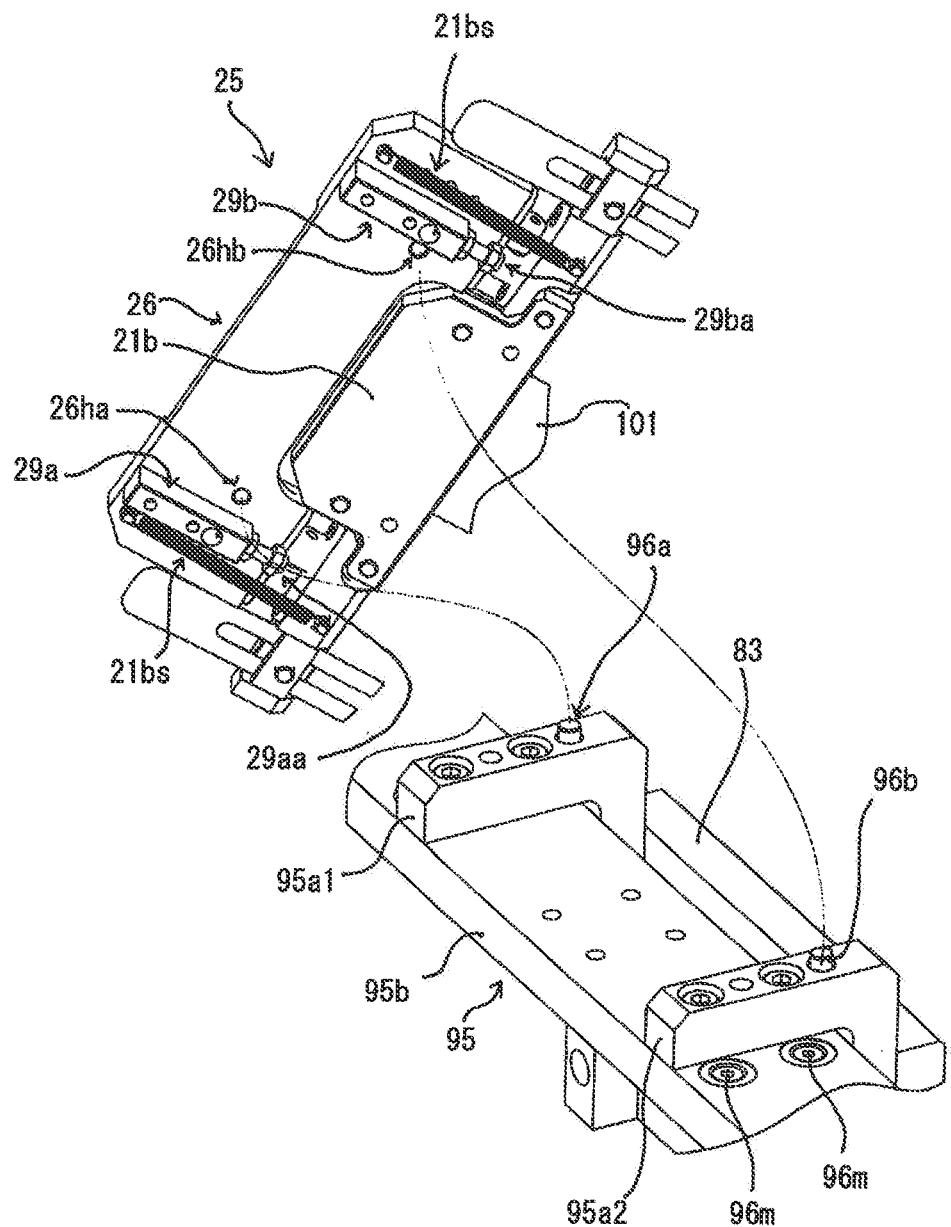
FIG. 4C shows a partial enlarged exploded perspective view illustrating a relationship of a second main body, an insertion pin, and a permanent magnet.
Figure 4D:
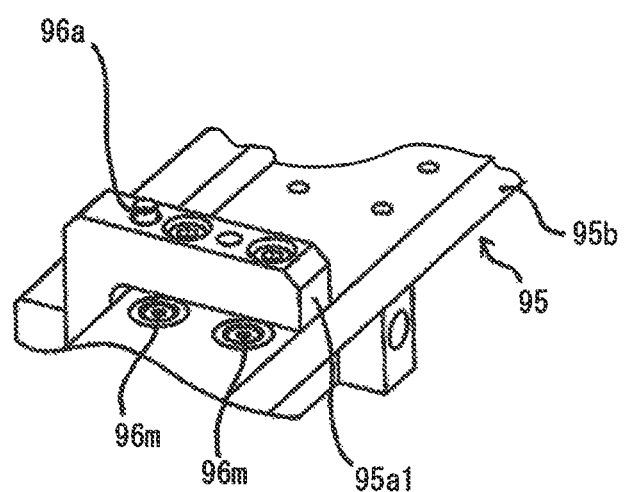
FIG. 4D shows a partial enlarged exploded perspective view illustrating the relationship of the second main body, the insertion pin, and the permanent magnet.
Figure 5:
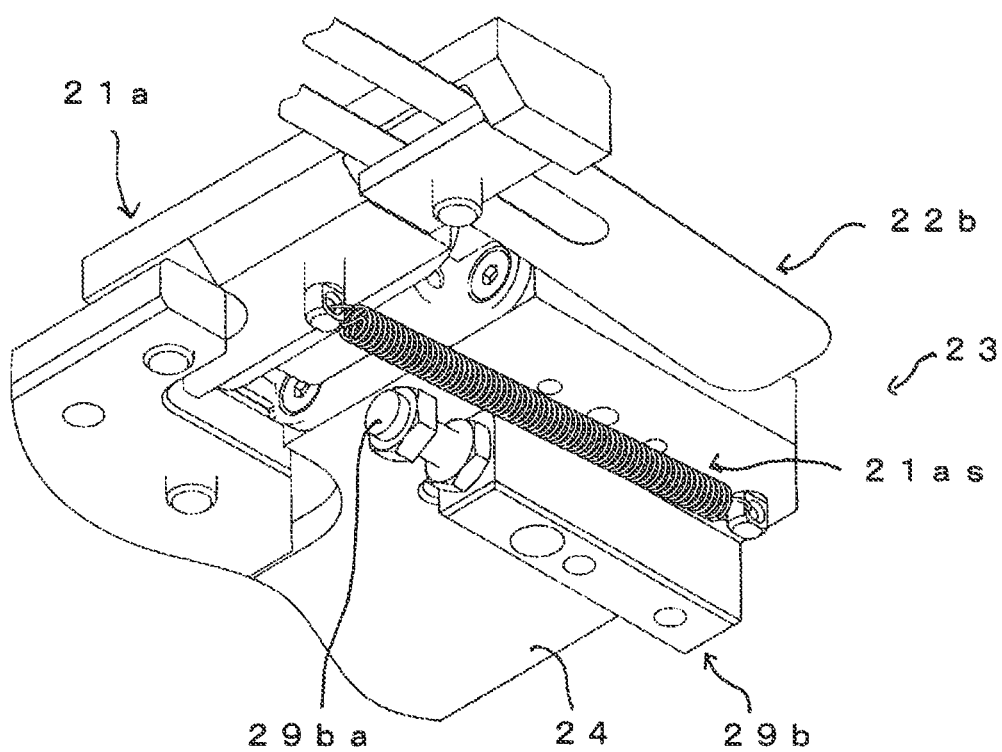
FIG. 5 shows a partial enlarged perspective view illustrating a rotation stopper to halt the rotation of a specimen supporting part.

FIG. 1 shows an exploded perspective view illustrating a deformation testing apparatus (present testing apparatus) 11 of an embodiment of the present invention and FIG. 2 shows a front view (It is viewed as indicated by an arrow V of FIG. 1. Here, a state retaining part 30 is removed therefrom and a driving part 97 is omitted from the view.) of the present testing apparatus 11; FIG. 3 shows an enlarged perspective view of a test cartridge 20 to be described later; FIGS. 4A and 4B show a partial enlarged exploded perspective view illustrating a relation of a first main part 24, insertion pins 94a, 94b, and permanent magnets 94m to be described later; FIGS. 4C and 4D show a partial enlarged exploded perspective view illustrating a relation of a second main part 26, insertion pins 96a, 96b, and permanent magnets 96m to be described later; and FIG. 5 shows a partial enlarged perspective view illustrating a rotation stopper 29b to halt a rotation of a specimen supporting part 21a to be described later. With reference to FIGS. 1 to 5, the present testing apparatus 11 will be explained.

The present testing apparatus 11 generally includes a testing apparatus main body 91, the test cartridge 20, and the state retaining part 30.

The testing apparatus main body 91 is configured to include a frame 92 set up on a placement surface 201 on which the present testing apparatus 11 is placed; a fixable support 93 to support detachably a first part member 23 of the test cartridge 20 to be arranged on an upper part of the frame 92; a moveable support 95 to support detachably a second part member 25 of the test cartridge 20; and a driving part 97 to make the moveable support 95 conduct a reciprocating motion in a displacement direction (an arrow S direction of FIGS. 1 and 2).

The frame 92 made of steel is structured in a rectangular shape being hollow and open and a lower part thereof contacts the placement surface 201.

And, from another aspect, the deformation testing machine which conducts a folding test of a plate-like specimen 101 includes the testing apparatus main body 91 and the test cartridge 20. The frame 92 configured to form a general shape of a testing machine main body by constituting edge members of the approximately rectangular shape; the fixable support 93 provided on a side along one edge member of a rectangular virtual plane defined by the surrounding frame 92 constituting a contour of an approximately rectangular space in a top view when the testing apparatus 91 is placed on an approximately horizontal placement surface; a pair of slide rails extending along two different edge members, which may be configured with the frame 92, extending from both ends of the one edge member, respectively, in a perpendicular direction thereto; the moveable support 95 including a base part 95b provided over and between approximately parallel slide rails 85a, 85b across the rectangular virtual plane in an opposing manner; and the driving part 97 to make the moveable support 95 conduct the reciprocating motion in the direction (the direction along the above-mentioned two different edge members) along the above-mentioned slide rails 85a, 85b are included.

The fixable support 93 includes a base part 93b bridged over the upper part of the frame 92; a pair of L-shaped angle members 93a1, 93a2 affixed on a top surface of base part 93b; a pair of insertion pins 94a, 94b provided as they are sticking upwardly out of respective top surfaces of the angle members 93a1, 93a2; and permanent magnets 94 buried in the top surface of the base part 93b near respective angle members 93a1, 93a2 (refer to FIG. 4B with respect to the permanent magnets 94m near the angle members 93a1). Here, the angle members 93a1, 93a2 support a fixable plate-like member 81 such that a main surface thereof may be vertical.

Further, from another aspect, the fixable support 93 includes: a rectangular-plate-like base part 93b (placed in an approximately horizontal manner as one plate surface (top surface) is upward) provided along the frame 92 constituting one edge member of the rectangular virtual plane; the pair of angle members 93a1, 93a2 affixed on the top surface of the base part 93b with a predetermined distance around at the middle point of the longitudinal direction (the direction along the above-mentioned edge member) of the base part 93b (they have an L shape configured as a left end of horizontal line segment thereof and a bottom end of vertical line segment are connected and, as the L shape is made upside down, they are brought closer to the base part 93b from the inner side of the approximately rectangular virtual plane of the testing apparatus main body 91 such that their bottom surfaces corresponding to the horizontal line segment are made contact and fixed to the top surface of the base part 93b and members corresponding to the vertical line segment hang down in the vertical direction on the inner side); the insertion pins 94a, 94b provided as they are sticking out upwardly on positions closer to the inner side of the above-mentioned approximately rectangular virtual plane and on the top surface corresponding to the horizontal line segment of the angle members 93a1, 93a2; and two permanent magnets 94m provided along the respective members corresponding to the horizontal line segment of the angle members 93a1, 93a2 and outside of the corresponding members (toward respective end portion sides in the longitudinal direction of the base part 93b) and on the top surface of the base part 93b.

The moveable support 95 includes: a base part 95b (It is slidable along the displacement direction (the arrow S direction in the figures) with respect to slide rails 85a, 85b.) attached in a striding manner over and between a pair of slide rails 85a, 85b attached to the top part of the frame 92 parallel to the displacement direction (the arrow S direction of FIGS. 1 and 2); a pair of L-shaped angle members 95a1, 95a2 attached to the top surface of the base part 95b; a pair of insertion pins 96a, 96b provided as they are sticking out upwardly from the respective top surfaces of the angle members 95a1, 95a2; and permanent magnets 96m (the permanent magnet 96m near the angle member 95a1 is not shown in the figure) buried in the top surface of the base part 95b near the respective angle members 95a1, 95a2. Here, the angle members 95a1, 95a2 support the moveable plate-like member 83 such that a main surface may be vertical. Further, from another aspect, the moveable support 95 includes: the rectangular-plate-like base part 95b (arranged in an approximately horizontal manner with one plate surface (top surface) upward) provided over in a striding manner over and between a pair of slide rails 85a, 85b and having mountable portions near both ends thereof corresponding to the respective slide rails 85a, 85b on which the mountable portions are mounted slidably along the slide rails 85a, 85b; the pair of angle members 95a1, 95a2 affixed on the top surface of the base part 95b with a predetermined distance around at the middle point of the longitudinal direction (the direction of striding the pair of slide rails 85a, 85b) of the base part 95b (they have an L shape configured as a left end of horizontal line segment thereof and a bottom end of vertical line segment are connected and, as the L shape is made upside down, they are brought closer to the base part 95b from the inner side of the approximately rectangular virtual plane of the testing apparatus main body 91 such that their bottom surfaces corresponding to the horizontal line segment are made contact and fixed to the top surface of the base part 93b and members corresponding to the vertical line segment hang down in the vertical direction on the inner side); the insertion pins 96a, 96b provided as they are sticking out upwardly on positions closer to the inner side of the above-mentioned approximately rectangular virtual plane and on the top surface corresponding to the horizontal line segment of the angle members 95a1, 95a2; and two permanent magnets 96m provided along the respective members corresponding to the horizontal line segment of the angle members 95a1, 95a2 and outside of the corresponding members (toward respective end portion sides in the longitudinal direction of the base part 95b) and on the top surface of the base part 95b.

The driving part 97 includes: a connecting rod 97a (a longitudinal direction thereof is parallel to the displacement direction (the arrow S direction of FIGS. 1 and 2)) to be connected to the moveable support 95 on the one end; and a driving unit 97b to make an end of the connecting rod 97a conduct a reciprocating motion with a predetermined amplitude and frequency in the displacement direction (the arrow S direction of FIGS. 1 and 2) so as to make the moveable support 95 conduct a reciprocating motion with a predetermined amplitude and frequency in the displacement direction (the arrow S direction of FIGS. 1 and 2).

Further, from another aspect, the driving part 97 includes: the connecting rod 97a extending in the displacement direction which is parallel to the slide rails 85a, 85b connected to the moveable support on the one end thereof; and the driving unit 97b to displace the connecting rod 97a in the direction (the axial direction of the connecting rod 97a) along the displacement direction toward the base end side as the other end of the connecting rod 97a. A portion constituted of the frame 92 and the driving unit 97b are respectively fixed to the placement surface 201 so as not to be moved even though the moveable support 95 connected to the one end of the connecting rod 97a is moved or the connecting rod 97a is moved (for example, the reciprocating movement).

The test cartridge 20 generally includes: a first part member 23 detachably attached to the fixable support 93 of the testing apparatus main body 91; and a second part member 25 detachably attached to the fixable support 95 of the testing apparatus main body 91. In the basic form, the test cartridge 20 has an approximately rectangular shape in the top view by its contour; is comprised of the first part member 23 and the second part member 25 corresponding to the fixable support 93 and moveable support 95, respectively, on their portions corresponding two opposing sides of the rectangular shape by its contour; is comprised of plate springs 22a, 22b on portions corresponding to the other two opposing sides of the above-mentioned rectangular shape; and is configured in a manner where the first part member 23 and the second part member 25 are connected.

The first part member 23 is configured to be comprised of a first main part 24 to be fixed by having a pair of insertion pins 94a, 94b inserted thereinto as the member approaches from above; and a specimen supporting part 21a fixed rotatably around a first rotation axis C1 (refer to FIG. 3) to the first main part 24. And the first part member 23 includes: a first main part 24, which is generally plate-like and shaped in a C shape in the top view, wherein a back portion of the C shape is along one of the two opposing sides of the rectangular shape and an opening portion on an opposite side from the back portion faces the inside of the above-mentioned rectangular by the contour; the specimen supporting part 21a exhibiting an approximately rectangular shape in the top view wherein at least a portion thereof enters the C shape and the other portion extends out of the opening portion to form an extending portion from which a little-bit extending portion (small extending portion) extends outside toward the plate springs 22a, 22b on both sides; and the first rotation axis C1 extending in the parallel direction to the opposing two sides of the above-mentioned rectangular shape, to which the first main part 24 and the specimen supporting part 21a are connected rotatably (for example, a hinge). Here, the end 23c of the first rotation axis C1 appears beyond the plate spring 22b (FIG. 2). Here, on the bottom surface of the first main part 24, a pair of insertion holes 24ha, 24hb (refer to FIG. 4A), into which the insertion pins 94a, 94b are to be inserted, are drilled and provided and the insertion pins 94a, 94b are provided on the top surface of the angle members 93a1, 93a2 such that the interference with a member provided on the bottom surface of the first main part 24 may be avoided.

And, when the first main part 24 is attached to the fixable support 93 (the insertion pins 94a, 94b are inserted into the insertion holes 24ha, 24hb), the permanent magnets 94m attract the first main part 24 (made of steel to be attracted by the magnet) such that the first main part 24 is surely attached to the fixable support 93.

And, rotation stoppers 29a, 29b to regulate the specimen supporting part 21a from rotating around the first rotation axis C1 as the center with respect to the first main part 24 are arranged to extend along an extending direction (or displacement direction) of the plate springs 22a, 22b on the bottom surface of the first main part 24 and separated from each other across a wider space than that between the positions of the outside walls of the pair of angle members 93a1, 93a2 provided separately with a predetermined distance along the back portion of the C shape of the first main part 24 to avoid the interference with the angle members 93a1, 93a2 (refer to FIGS. 4A and 5). When the specimen supporting part 21a rotates around the first rotation axis C1 as the center, the rotation stoppers 29a, 29b do not allow further rotation thereof as leading ends 29aa, 29ba hit or abut the bottom surfaces of the plate spring fixing piece comprised of a small piece extending outside so as to be connected and fixed to the small extending portion or the bottom surface of the small extending portion of the specimen supporting part 21a.

Further, the specimen supporting part 21a has mounting protrusions on which end parts of a pair of tension springs 21as extending along the extending direction (or displacement direction) of the plate springs 22a, 22b are hung, respectively, the mounting protrusions being arranged on the bottom surface with a wide interval larger than clearance-added interval of the positions of the respective outside walls of the rotation stoppers 29a, 29b, the other end parts of the pair of tension springs 21as being hung on respective mounting protrusions provided on the bottom surface of the first main part 24. The pair of tension springs 21as are arranged lower than the first rotation axis C1 such that the specimen supporting part 21a is pulled to rotate downward such that the specimen supporting part 21a is prevented from rotating upward around the first rotation axis C1 as the center such that the specimen 101 is always kept to be bent downward in a bow-shaped manner (The tension springs 21as correspond to springs 11 to pull holding parts 5, 6 downward in the patent reference 1.).

The second part member 25 is configured to include: the second main part 26 attached thereto by having the pair of insertion pins 96a, 96b inserted thereinto as the second main part 26 approaches from above; and the specimen supporting part 21b fixed rotatably to the second rotation axis C2 (Refer to FIG. 3. C1 and C2 are parallel.) as the center with respect to the second main part 26. And the second part member 25 includes: a second main part 26, which is generally plate-like and shaped in a C shape in the top view, wherein a back portion of the C shape is along one of the two opposing sides of the rectangular shape and an opening portion on an opposite side from the back portion faces the inside of the above-mentioned rectangular by the contour; the specimen supporting part 21b exhibiting an approximately rectangular shape in the top view wherein at least a portion thereof enters the C shape and the other portion extends out of the opening portion to form an extending portion from which a little-bit extending portion (small extending portion) extends outside toward the plate springs 22a, 22b on both sides; and the second rotation axis C1 extending in the parallel direction to the opposing two sides of the above-mentioned rectangular shape, to which the second main part 26 and the specimen supporting part 21b are connected rotatably. Here, the end 25c of the second rotation axis C2 appears beyond the plate spring 22b (FIG. 2). Here, on the bottom surface of the second main part 26, a pair of insertion holes 26ha, 26hb, into which the insertion pins 94a, 94b are to be inserted, are drilled and provided and the insertion pins 96a, 96b are provided on the top surface of the angle members 95a1, 95a2 such that the interference with a member provided on the bottom surface of the second main part 26 may be avoided.

And, when the second main part 26 is attached to the moveable support 95 (the insertion pins 96a, 96b are inserted into a pair of insertion holes on the bottom surface of the second main part 26), the permanent magnets 96m attract the second main part 26 (made of steel to be attracted by the magnet) such that the second main part 26 is surely attached to the moveable support 95.

And, rotation stoppers 29a, 29b to regulate the specimen supporting part 21b from rotating around the second rotation axis C2 as the center with respect to the second main part 26 are arranged to extend along an extending direction (or displacement direction) of the plate springs 22a, 22b on the bottom surface of the second main part 26 and separated from each other across a wider space than that between the positions of the outside walls of the pair of angle members 95a1, 95a2 provided separately with a predetermined distance along the back portion of the C shape of the second main part 26 to avoid the interference with the angle members 95a1, 95a2. The rotation stoppers are similar to the above-mentioned rotation stoppers 29a, 29b, when the specimen supporting part 21b rotates around the second rotation axis C2 as the center, and the rotation stoppers 29a, 29b do not allow further rotation thereof as leading ends thereof hit or abut the bottom surfaces of the plate spring fixing piece comprised of a small piece extending outside so as to be connected and fixed to the small extending portion or the bottom surface of the small extending portion of the specimen supporting part 21b.

Further, the specimen supporting part 21b has mounting protrusions on which end parts of a pair of tension springs 21bs extending along the extending direction (or displacement direction) of the plate springs 22a, 22b are hung, respectively, the mounting protrusions being arranged on the bottom surface with a wide interval larger than clearance-added interval of the positions of the respective outside walls of the rotation stoppers 29a, 29b, the other end parts of the pair of tension springs 21bs being hung on respective mounting protrusions provided on the bottom surface of the second main part 26. The pair of tension springs 21bs are arranged lower than the second rotation axis C2 such that the specimen supporting part 21b is pulled to rotate downward such that the specimen supporting part 21b is prevented from rotating upward around the second rotation axis C2 as the center such that the specimen 101 is always kept to be bent downward in a bow-shaped manner (The tension springs 21bs correspond to springs 11 to pull holding parts 5, 6 downward in the patent reference 1.).

The plate springs 22a, 22b are straight-strip-like (elongated-plate-like) springs having respective end parts held by the specimen support 21a and the other end parts thereof held by the specimen support 21b, longitudinal directions of the strip-like shape are arranged to be parallel with each other (When the test cartridge 20 is attached to the testing apparatus main body 91, the longitudinal direction of the strip shape is parallel to the displacement direction (an arrow S direction of FIGS. 1 and 2).). In the case where no force other than the gravity force is applied (may also be called as no-load-state), the plate springs 22a, 22b biases the specimen supporting parts 21a, 21b to separate to each other such that both main surfaces of the specimen may be approximately along a plane (Here, a surface (here, it is a top surface) of the specimen supporting part 21a on which the specimen 101 is bonded; and a surface (here, it is a top surface) of the specimen supporting part 21b are, strictly speaking, turned slightly downward by the pulling force of the tension springs 21as, 21bs, but are located in one approximately horizontal plane. Both main surfaces of the specimen 101 are slightly bent downward in a bow-shaped manner by pulling force of these tension springs 21as, 21bs, but they are approximately in a state along the plane.). That is, approximately rectangular shape of the test cartridge 20 in the top view is generally constituted such that the first part member 23 and the second part member 25 are connected and a space where the specimen 101 is hold in the center is secured as described below.

The specimen 101 herein has both main surfaces in an approximately rectangular shape and is a thin and flexible resin plate to be used as a flexible display of the organic electroluminescence.

The specimen 101 is mounted thereon as a surface (here, it is a top surface thereof) of the specimen supporting part 21a of the first part and a surface (here, it is a top surface thereof) are bonded with adhesive to portions near both sides of the specimen 101 (portions within predetermined respective widths from both sides).

And, in the case where no other force than the gravity force is applied to the first part member 23 and the second part member 25, both main surfaces of the specimen 101 are approximately along a plane (As described above, the both main surfaces of the specimen 101 are, strictly speaking, bent slightly downward in a bow-shaped manner by the tension force of the tension springs 21as, 21bs.).

A state retaining part 30 is configured to include straight strip-like (elongated plate-like) retaining plates 31, 32; mounting screws 35a, 35b for fixing the retaining plate 31 to the test cartridge 20; and mounting screws 36a, 36b for fixing the retaining plate 32 to the test cartridge 20. The retaining plates 31, 32 have elongated holes 31h, 32h formed along the longitudinal directions thereof, respectively. Any of respective shafts of the mounting screws 35a, 35b can penetrate the elongated hole 31h, but the respective heads of the mounting screws 35a, 35b cannot penetrate the elongated hole 31h. In a similar manner, any of the shafts of the mounting screws 36a, 36b can penetrate the elongated hole 32h, but the respective heads of the mounting screws 36a, 36b cannot penetrate the elongated hole 32h. The shafts of the mounting screws 35a, 36a are threaded to have male screws thereon and female screws 27a, 27b which are capable of being screwed to the male screws, respectively, are drilled and formed in the top surface of the first part member 23 (the first main part 24) whereas the shafts of the mounting screws 35b, 36b are threaded to have male screws thereon and female screws 28a, 28b which are capable of being screwed to the male screws, respectively, are drilled and formed in the top surface of the second part member 25 (the second main part 26).

In order to conduct a folding test of the specimen 101 with the present testing apparatus 11, first of all, as mentioned above, the test cartridge 20 is mounted in the testing apparatus main body 91. At this time, insertion pins 94a, 94b are inserted into insertion holes 24ha, 24hb (refer to FIG. 4A) and insertion pins 96a, 96b are inserted into insertion holes formed in the bottom surface of the second main part 26. In this state, the permanent magnet 94m attracts the first main part 24 and the permanent magnet 96m attracts the second main part 26 such that it is secured that the test cartridge 20 is mounted on the testing apparatus main body 91.

Secondly, portions near both sides of the specimen 101 are glued to the surface (here, it is a top surface) of the specimen supporting part 21a, 21b. In a state where the surface (top surface) of the specimen supporting part 21a and the surface (top surface) of the specimen supporting part 21b nearly belong to one plane (plane including the first rotation axis C1 and the second rotation axis C2 that are mutually parallel), the gluing is normally made such that both main surfaces of the specimen are nearly along the one plane (As mentioned above, strictly speaking, the surface (top surface) of the specimen supporting part 21a and the surface (top surface) of the specimen supporting part 21b are slightly turned downwardly by pulling force of the tension springs 21as, 21bs and the both main surfaces of the specimen 101 are slightly bent downwardly in a bow-shaped manner.).

Thirdly, the moveable support 95 is reciprocated in the direction parallel to the arrow S with the predetermined amplitude and frequency by the driving part 97 (the state retaining part 30 is not mounted at this time). The reciprocating motion of the moveable support 95 makes the second part member 25 mounted on the moveable support 95 reciprocate in the direction parallel to the arrow S with the predetermined amplitude and frequency. Here, since the first part member 23 is fixed, the distance between the first part member 23 and the second part member 25 is made longer and shorter by the reciprocating motion (the distance is shortened against the bias force of the plate springs 22a, 22b) such that the specimen 101 mounted between the first part member 23 and the second part member 25 is bent and stretched (Here, the specimen 101 is always bent downward in a bow-shaped manner by the tension spring 21as, 21bs.).

After the specimen 101 is bent and stretched for the predetermined number of times, in the case where the specimen 101 is observed and analyzed or else, the state retaining part 30 is mounted on the test cartridge 20 in the condition where the specimen 101 is in a desired bow-shaped state. More specifically, the driving part 97 is stopped such that the specimen 101 is in the desired bow-shaped state, and, in such a state, the retaining plates 31, 32 where the shafts of the mounting screws 35a, 35b are made to pass through the elongated hole 31h and the shafts of the mounting screws 36a, 36b are made to pass through the elongated hole 32h are mounted on the test cartridge 20 (More specifically, the mounting screws 35a, 36a are screwed into the female screws 27a, 27b and the mounting screws 35b, 36b are screwed into the female screws 28a, 28b so as to tighten them. In this way, the positions of the mounting screws 35a, 35b relative to the elongated hole 31h are fixed and the positions of the mounting screws 36a, 36b relative to the elongated hole 32h are fixed.). In this way, the state retaining part 30 prevents the distance between the first part member 23 and the second part member 25 from changing such that the desired bow-shape state of the specimen 101 is retained even though the test cartridge 20 is removed from the testing apparatus main body 91.

As mentioned above, the test cartridge 20 on which the state retaining part 30 is mounted is removed from the testing apparatus main body 91 by moving it upward. More specifically, the force is applied such that the test cartridge 20 is moved upward relative to the testing apparatus main body 91 such that the test cartridge 20 can be removed from the testing apparatus main body 91 against the attractive force of the permanent magnets 94m, 96m and the gravity force of the test cartridge 20 (At this time, the insertion pins 94a, 94b are pulled out from the insertion holes 24ha, 24hb and the insertion pins 96a, 96b are pulled out from the insertion holes formed in the bottom surface of the second main part 26.).

In the test cartridge 20 having been removed from the testing apparatus main body 91, the state retaining part 30 mounted thereon prevent the distance between the first part member 23 and the second part member 25 from changing such that the desired bow-shape state of the specimen 101 is retained such that the specimen 101 can be observed or analyzed or else as it is in the desired bow-shape state.

After observing or analyzing or doing something else with the specimen 101, the test cartridge 20 on which the state retaining part 30 is mounted is mounted back to the testing apparatus main body 91 (The insertion pins 94a, 94b are inserted into the insertion holes 24ha, 24hb and the insertion pins 96a, 96b are inserted into the insertion holes formed in the bottom surface of the second main part 26. Then, the test cartridge 20 is securely mounted to the testing apparatus main body 91 by the attractive force of the permanent magnets 94m, 96m.). Then, the state retaining part 30 is removed from the test cartridge 20 (The mounting screws 35a, 36a are pulled out of the female screws 27a, 27b and the mounting screws 35b, 36b are pulled out of the female screws 28a, 28b.). In this way, the distance between the first part member 23 and the second part member 25 is allowed to change such that the folding test of the specimen 101 can be resumed and continued by reciprocating the moveable support 95 in the direction parallel to the arrow S with the predetermined amplitude and frequency. And, after this folding test, the test cartridge 20 can be removed from the testing apparatus main body 91 and the specimen 101 can be observed or analyzed or else appropriately as many times as wished in the same way as mentioned above.

Figure 6:
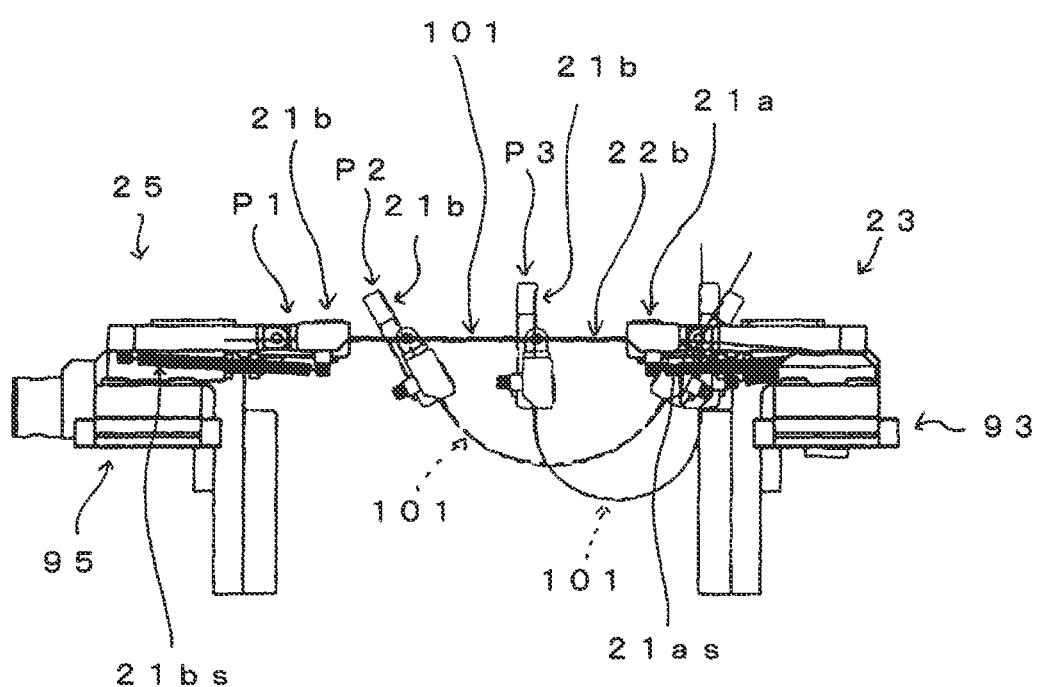
FIG. 6 shows a front view illustrating a situation of a deformation test.

For example, in the folding test of the specimen 101 as shown in FIG. 6 (diagram showing part including the first part member 23 and the second part member 25 if viewed from the same direction as of FIG. 2), the specimen 101 is bent downward largely in a bow-shape manner from an approximately flat state by starting from the state where the specimen supporting part 21b is the farthest from the first part member 23 (At this time, as mentioned above, both main surfaces of the specimen 101 is bent downward slightly in a bow-shape manner, strictly speaking, by the pulling force of the tension spring 21as, 21bs, but they are in a state nearly along the plane. The position of the specimen supporting part 21b in this state is indicated by P1) to the state where the specimen supporting part 21b approaches the first part member 23 (Both main surfaces of the specimen 101 in this state are bent downward in a bow-shape manner. The position of the specimen supporting part 21b in this state is indicated by P2.) and then to the state where the specimen supporting part 21b is the closest to the first part member 23 (At this time, both main surfaces of the specimen 101 are bent largely downward in a bow-shape manner. The position of the specimen supporting part 21b in this state is indicated by P3.). Thereafter, the specimen supporting part 21b returns from the position P3 to the position P1 via the position P2 such that the specimen 101 undergoes the state of being bent largely downward in a bow-shape manner to being nearly flat. In this way, the specimen supporting part 21b is displaced from the position P1, the position P2, the position P3, the position P2, and back to the position P1 such that the specimen 101 is bent and stretched one time such that the bending and stretching test of the specimen 101 can be conducted by appropriately setting a moving speed of the specimen supporting part 21b, a displacement distance (distance between the position P1 and the position P3), and a repetition number of times.

Figure 7A:
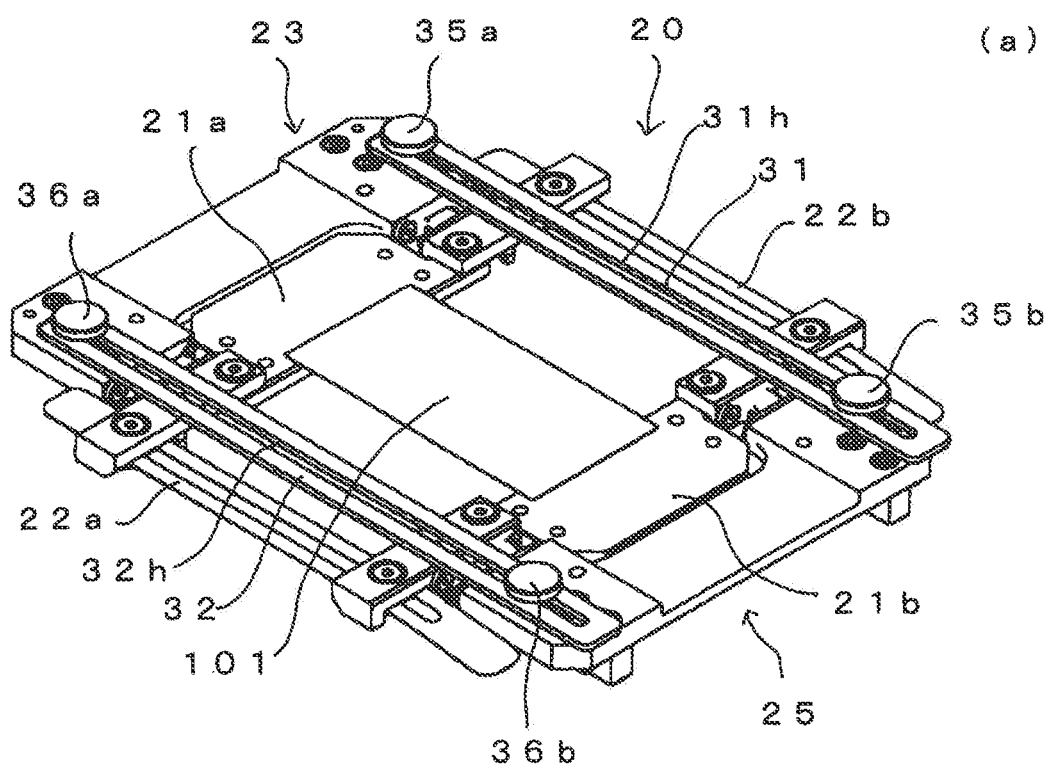
FIG. 7A shows a perspective view illustrating a situation where a test cartridge is removed from a testing apparatus main body.
Figure 7B:
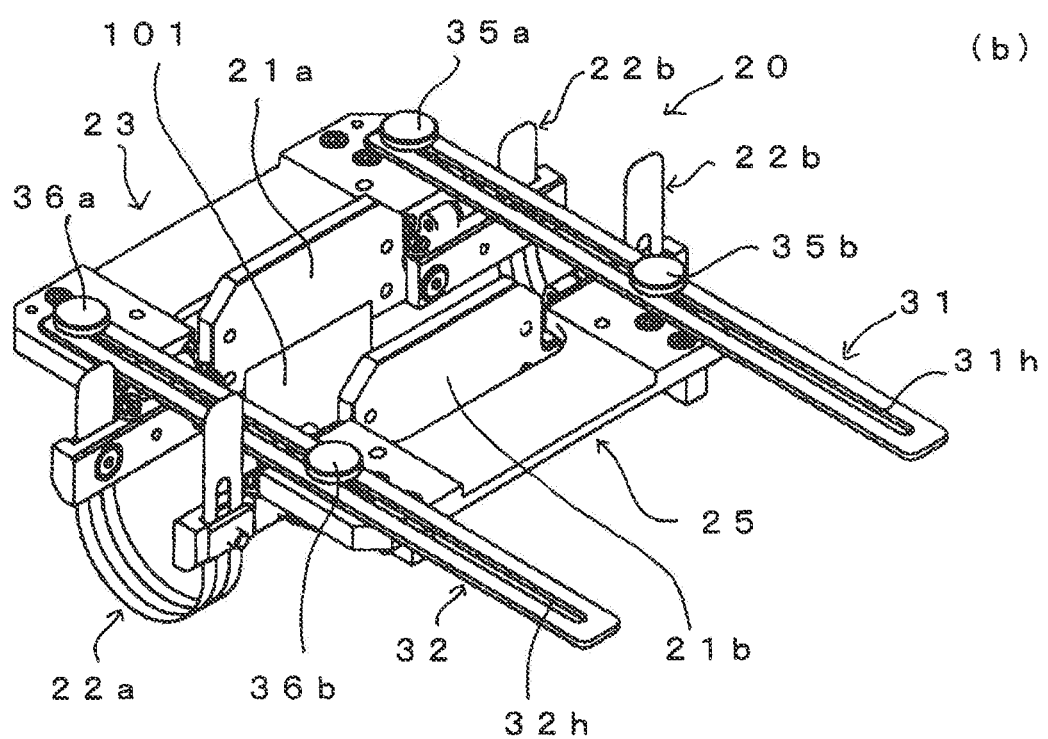
FIG. 7B shows a perspective view illustrating a situation where the test cartridge is removed from the testing apparatus main body.

With respect to any position of the position P1 to the position P3 of the specimen supporting part 21b, the specimen 101 can be observed or analyzed or else as the desired bowed state is kept by removing the test cartridge 20 from the testing apparatus main body 91 as the desired bowed state of the specimen 101 is kept by mounting the state retaining part 30 on the test cartridge 20. For example, FIG. 7A shows a perspective view illustrating a test cartridge 20 removed from the testing apparatus main body 91, on which the state retaining part 30 is mounted in the state where the specimen supporting part 21b is at the position P1 in FIG. 6;

FIG. 7B shows a perspective view illustrating the test cartridge 20 removed from the testing apparatus main body 91, on which the state retaining part 30 is mounted in the state where the specimen supporting part 21b is at the position P3 in FIG. 6; the desired bowed state of the specimen 101 is retained in any of FIGS. 7A and 7B.

Then, as mentioned above, after the specimen 101 is observed and analyzed or else, the test cartridge 20 on which the state retaining part 30 is mounted is attached back to the testing apparatus main body 91, and then the state retaining part 30 is removed from the test cartridge 20 such that the folding test of the specimen 101 can be resumed again. In this way, the folding test of the specimen 101 and the observation and analysis and the like of the specimen 101 (in the state where the test cartridge 20 is removed from the testing apparatus main body 91) can be repeated freely as many times as wished.

Also, since the test cartridge 20 is adapted to be freely attachable and detachable, a plurality of test cartridges 20 on which the specimens 101 have been mounted, respectively, may be prepared beforehand such that the folding test can be conducted with the plurality of test cartridges 20 by attaching them to the testing apparatus main body 91 one after another (the time period for which the test cartridge 20 is attached to the testing apparatus main body 91 is much shorter if compared to the time period for which the specimen 101 is mounted on the test cartridge 20) such that a plurality of folding tests can be conducted quickly (As the test cartridges 20 corresponding to the respective folding tests are exchanged one after another, the plurality of folding tests can be conducted quickly such that the operation rate of the testing apparatus main body 91 can be improved.).

As explained above, the present testing apparatus 11 is a deformation testing apparatus (here, it is a folding test machine) configured to include: a detachable part (here, it is a test cartridge 20) to repeat a displacement cycle (displacement cycle in which a specimen supporting part 21b shifts from a position P1, a position P2, a position P3, the position P2, and the position P1) that is a relative displacement of a second part (here, it is a second part member 25) relative to a first part (here, it is a first part member 23) to cause a specimen 101 to undergo a predetermined deformation cycle which is from a first shape state (a state where a specimen supporting part 21b is at the position P1) to a second shape state (a state where the specimen supporting part 21b is at the position P3) and then back to the first shape state (the state where the specimen supporting part 21b is at the position P1); and a main body part (here, it is a testing apparatus main body 91) to which the detachable part (test cartridge 20) is freely detachably attached, wherein state retaining means (here, it is a state retaining part 30) to fix a relative position of the second part (second part member 25) relative to the first part (first part member 23) in at least one (here, it is 'all') shape state among any shape state the specimen may take is freely attachable to and detachable from the detachable part (test cartridge 20) attached to the main body part (testing apparatus main body 91).

With respect to the present testing apparatus 11, the detachable part (test cartridge 20) is configured to include a state retaining means mounting part (Here, male screws having shafts threaded of mounting screws 35a, 36a is configured to comprise female screws 27a, 27b; and female screws 28a, 28b on which male screws may be threaded which can be screwed by male screws where threaded shafts of the mounting screws 35b, 36b can be screwed).

In the present testing apparatus 11, in transition from the first shape state (the specimen supporting part 21b is at the position P1) to the second shape state (the specimen supporting part 21b is at the position P3), the distance between the first part (first part member 23) and the second part (second part member 25) decreases and the detachable part (test cartridge 20) is configured to have biasing means (here, plate springs 22a, 22b) for biasing the first part (first part member 23) and the second part (second part member 25) such that the distance is increased in shifting from the second shape state (the specimen supporting part 21b is at the position P3) to the first shape state (the specimen supporting part 21b is at the position P1) such that the state retaining means (state retaining part 30) is means for preventing the distance from increasing which prevents the distance from increasing.

In the present testing apparatus 11, the state retaining means (state retaining part 30) is configured to include a state retaining member (here, retaining plates 31, 32), one end of which is attached to the first part (first part member 23) and the other end of which is attached to the second part (second part member 25); a detachable part-on-one-end-side (here, mounting screws 35a, 36a) to fasten the one end of the state retaining member (retaining plates 31, 32) to the first part (first part member 23) in a freely attachable and detachable manner; a detachable part-on-the-other-end-side (here, mounting screws 35b, 36b) to fasten the other end of the state retaining member (retaining plates 31, 32) to the second part (second part member 23) in a freely attachable and detachable manner.

In the present testing apparatus 11, the state retaining means (state retaining part 30) is what can fix the relative position of the second part (second part member 25) relative to the first part (first part member 23) in every shape state of shape states that the specimen 101 can take (Here, the first part member 23 and the second part member 25 can be fastened to the retaining plates 31, 32 by tightening the mounting screws 35a, 36a, 35b, 36b at any portion of the elongated holes 31h, 32h along the longitudinal direction.).

In the present testing apparatus 11, when the detachable part (test cartridge 20) is attached to the main body part (testing apparatus main body 91), the detachable part (test cartridge 20) can be moved in a predetermined direction (vertically upward direction indicated by an arrow K in the figure) relative to the main body part (testing apparatus main body 91) and the detachable part (test cartridge 20) can be removed from the main body part (testing apparatus main body 91), but the detachable part is not allowed to be moved relative to the main body part (testing apparatus main body 91) in an opposite direction to the predetermined direction (vertically upward direction as indicated by the arrow K) by making the detachable part (test cartridge 20) and the main body part (testing apparatus main body 91) hit or abut each other, and the detachable part is not allowed to be moved relative to the main body part (testing apparatus main body 91) in any direction along a plane (here, a horizontal plane) perpendicular to the predetermined direction (vertically upward direction as indicated by the arrow K).

In the present testing apparatus 11, movement regulating means to regulate the movement of the detachable part (test cartridge 20) relative to the main body part (testing apparatus main body 91) in the predetermined direction (vertically upward direction as indicated by the arrow K) is provided.

In the present testing apparatus 11, the movement regulating means includes at least either (here, both) of gravity force of the detachable part (test cartridge 20) when the opposite direction to the predetermined direction (vertically upward direction as indicated by the arrow K) has a vertically downward component (Here, the opposite direction is a vertically downward direction.); and magnetic force generation means (here, permanent magnets 94m, 96m) provided to either one (here, the testing apparatus main body 91) of the detachable part (test cartridge 20) or the main body part (testing apparatus main body 91) so as to attract the other (here, the test cartridge 20).

In the present testing apparatus 11, either one (here, the testing apparatus main body 91) of the detachable part (test cartridge 20) or the main body part (testing apparatus main body 91) has projection members (here, insertion pins 94a, 94b and insertion pins 96a, 96b) sticking out in the predetermined direction or the opposite direction (here, the predetermined direction (vertically upward direction as indicated by the arrow K)); and the other (here, the test cartridge 20) has insertion holes (here, insertion holes 24ha, 24hb into which insertion pins 94a, 94b formed on the bottom surface of the first main part 24 are inserted and a pair of insertion holes into which the insertion pins 96a, 96b formed on the bottom surface of the second main part 26 are inserted) into which the projection members (insertion pins 94a, 94b and insertion pins 96a, 96b) are inserted in the predetermined direction or the opposite direction thereto (here, the predetermined direction (vertically upward direction as indicated by the arrow K)).

In the present testing apparatus 11, the main body part (testing apparatus main body 91) is configured to include: a first holding member (here, a fixable support 93) to which the first part (first part member 23) is attached; a second holding member (here, a moveable support 95) to which the second part (second part member 25) is attached; and driving means (here, driving part 97) to repeatedly displace relatively the first holding member (fixable support 93) and the second holding member (moveable support 95) such that the first part (first part member 23) attached to the first holding member (fixable support 93) and the second part (second part member 25) attached to the second holding member (moveable support 95) repeat the deformation cycle.

And, in another embodiment, the first holding member to which the first part (first part member 23) is attached can be moveable and, in such a case, as long as the distance from the first holding member can change relatively and repeatedly, the second holding member may be fixed or be moveable.

As aforementioned, in one of the embodiments of the present invention, a deformation testing apparatus (11) to evaluate a specimen of a plate form or a film form by bending the specimen in a bow-shaped manner comprises:

a first holding member (93) and a second holding member (95), a distance of which can be changed relatively and repeatedly at least one direction (for example, S);

a driving part (97) capable of changing repeatedly a relative distance between the first holding member (93) and the second holding member (95);

a test cartridge (20) to hold the specimen to be bent in a bow-shape manner by engaging the first holding member (93) and the second holding member (95);

wherein the test cartridge (20) comprises:

a first part member (23) to engage the first holding member (93);

a second part member (25) to engage the second holding member (95);

an elastic member (for example, plate springs 22a, 22b) bridged between the first part member (23) and the second part member (25) along the at least one direction (for example, S) and being capable of maintaining a predetermined distance thereof without any load;

state retaining part (30) capable of retaining a relative distance between the first part member (23) and the second part member (25) with or without any load along the at least one direction (for example, S) by fixing;

wherein the first part member (23) comprises:

a first main part (24) configured to be capable of moving together with the first holding member (93) as being engaged and fixed along the at least one direction (for example, S), the first main part (24) engaging the first holding member (93);

a first specimen supporting part (21a) configured to be connected rotatably via a rotation axis (C1) substantially perpendicular to the at least one direction to the first main part (24), wherein the first main part (24) comprises an engaging member (for example, insertion holes 24ha, 24hb) attachable and detachable to the first holding member (93) by a movement in a substantially perpendicular direction to the at least one direction (for example, S); and the first holding member (93) comprises a corresponding member (for example, insertion pins 94a, 94b) being capable of corresponding to the engaging member, the second part member 25 comprises:

a second main part (26) configured to be capable of moving together with the second holding member (95) as being engaged and fixed along the at least one direction, the second main part (26) engaging the second holding member (95);

a second specimen supporting part (21b) configured to be connected rotatably via a rotation axis (C2) substantially perpendicular to the at least one direction (for example, S) to the second main part (26), wherein the second main part (26) comprises an engaging member (for example, insertion holes 26ha, 26hb) attachable and detachable to the second holding member (95) by a movement in a substantially perpendicular direction to the at least one direction (for example, S), and the second holding member (95) comprises a corresponding member (for example, insertion pins 96a, 96b) being capable of corresponding to the engaging member, wherein the first specimen supporting part (21a) and the second specimen supporting part (21b) are configured to be capable of holding different portions of the specimen (101), and the first specimen supporting part (21a) and the second specimen supporting part (21b) are configured such that the specimen (101) can be placed between the first specimen supporting part (21a) and the second specimen supporting part (21b) by the holding different portions; and wherein the state retaining part (30) is configured such that the relative distance can be fixed against the resilience of the elastic member (for example, plate springs 22a, 22b).

Here, the above-mentioned state retaining part (30) can include a fixing device (for example, fastener, screw, bolt, convex part, and corresponding fastener, screw hole, nut, convex part and so on) that can fix the structure and/or material and elastic member and specimen as is in the state retaining part sufficiently enough endurable against the resilience of the above-mentioned elastic member (for example, plate springs 22a, 22b) and the above-mentioned specimen (101). Also, the above-mentioned state retaining part (30) can provide an appropriate clearance when the engagement of the above-mentioned engaging member (for example, insertion holes 24ha, 24hb) and the above-mentioned corresponding member (for example, insertion pins 94a, 94b) and the above-mentioned engaging member (for example, insertion holes 26ha, 26hb) and the above-mentioned corresponding member (for example, insertion pins 96a, 96b) is released.

Further, the test cartridge (20) is configured such that the above-mentioned first holding member (93) and the above-mentioned second holding member (95) are configured to be capable of halting at any position in the at least one direction (for example, S) such that the above-mentioned state retaining part (30) can fix the above-mentioned elastic member (for example, plate springs 22a, 22b) and the above-mentioned specimen (101).

EXPLANATION OF NUMERALS

| | |
|---|---|
| 11 present testing apparatus | 20 test cartridge |
| 21a specimen supporting part | 21as tension spring |
| 21b specimen supporting part | 21bs tension spring |
| 22a, 22b plate spring | 23 first part member |
| 24 first main part | 24ha, 24hb insertion hole |
| 25 second part member | 26 second main part |
| 27a, 27b female screw | 28a, 28b female screw |
| 29a, 29b rotation stopper | 29aa, 29ba leading ends |
| 30 state retaining part | 31, 32 retaining plate 31 |
| 31h, 32h elongated hole | 35a, 35b mounting screw |
| 36a, 36b mounting screw | 81 fixable plate-like member |
| 83 moveable plate-like member | 85a, 85b slide rail |
| 91 testing apparatus main body | 92 frame | 93 fixable support |
| 93a1, 93a2 angle member | 93b base part | |
| 94a, 94b insertion pin | 94m permanent magnet | |
| 95 moveable support | 95a1, 95a2 angle member | |
| 95b base part | 96a, 96b insertion pin | |
| 96m permanent magnet | 97 driving part | 97a connecting rod |
| 97b driving unit | 101 specimen | |
| 201 placement surface | | |

What is claimed is:

1. A deformation testing apparatus comprising:
a test cartridge comprising: a first part member and a second part member, wherein the first part member and the second part member are comprised of a first attachment portion and a second attachment portion, respectively, that hold at least two different portions of a specimen wherein the test cartridge is configured to perform a deformation cycle to move relatively the second part member and/or the first part member to cause the specimen to be deformed and change from a first shape state to a second shape state and then back to the first shape state;
a testing apparatus main body to which the test cartridge is removably attached; and,
a state retaining part configured to fix a relative position of the second part member relative to the first part member in at least one shape state of the specimen wherein the state retaining part is removably attached to the test cartridge.

2. The deformation testing apparatus according to claim 1 wherein the state retaining part of the test cartridge fixes the relative positions of the first part member and the second part member when the deformation cycle is stopped.

3. The deformation testing apparatus according to claim 1, wherein distance between the first part member and the second part member decreases in shifting from the first shape state to the second shape state,
wherein the test cartridge is configured to have a plate spring to bias the first part member and/or the second part member such that the distance between the first part member and the second part member is increased in shifting from the second shape state to the first shape state, and
wherein the state retaining part prevents the distance between the first part member and the second part member from increasing.

4. The deformation testing apparatus according to claim 1, wherein distance between the first part member and the second part member increases in shifting from the first shape state to the second shape state,
wherein the test cartridge is configured to have a plate spring to bias the first part member and/or the second part member such that the distance between the first part member and the second part member is decreased in shifting from the second shape state to the first shape state, and
wherein the state retaining part prevents the distance between the first part member and the second part member from decreasing.

5. The deformation testing apparatus according to claim 3, wherein the state retaining part comprises: a state retaining member having a first end side and a second end side; a first fastener to fasten removably the first end side of the state retaining member to the first part member; and a second fastener to fasten removably the second end side of the state retaining member to the second part member.

6. The deformation testing apparatus according to claim 1, wherein the state retaining part is capable of fixing a relative position of the second part member relative to the first part member for any shape state of the specimen.

7. The deformation testing apparatus according to claim 1, wherein the test cartridge is removably mounted to the testing apparatus main body by moving the test cartridge in a single predetermined direction relative to the testing apparatus main body when the test cartridge is attached to the testing apparatus main body, and the test cartridge is prevented from being moved in an opposite direction to the single predetermined direction relative to the testing apparatus main body as the test cartridge hits the testing apparatus main body and the test cartridge is prevented from being moved in any direction perpendicular to the single predetermined direction.

8. The deformation testing apparatus according to claim 7, wherein the testing apparatus main body comprises a portion on which the first part member or the second part member of the test cartridge stays by an own weight thereof and/or by a magnet provided thereto.

9. The deformation testing apparatus according to claim 7, wherein either one of the test cartridge and the testing apparatus main body has a projection member sticking out in the predetermined direction or the opposite direction thereto and the other has an insertion hole into which the projection member is inserted in the predetermined direction or the opposite direction thereto.

10. The deformation testing apparatus according to claim 1, wherein the testing apparatus main body comprises: a first holding member to hold the first part member; a second holding member to hold the second part member; and driving part to displace the first part member and the second part member relatively and repeatedly as the displacement cycle is repeated with respect to the first part member held by the first holding member and the second part member held by the second holding member.

11. A test cartridge constituting a deformation testing apparatus as described in claim 1 wherein the test cartridge comprises: the first part member and the second part member.

12. A testing apparatus main body constituting a deformation testing apparatus as described in claim 1 wherein the testing apparatus main body further comprises: a slide rail along which the first part member and/or the second part member slides.

13. A state retaining part attached to a deformation testing apparatus as described in claim 1 wherein the state retaining part comprises a retaining plate and a mounting screw.

14. The deformation testing apparatus according to claim 1, comprising: a driving part configured to cause reciprocating motion.

15. A deformation testing apparatus comprising:
a test cartridge comprising: a first part member and a second part member, the first part member and the second part member are comprised of a first attachment portion and a second attachment portion, respectively, that hold at least two different portions of a specimen of a plate form, wherein the test cartridge is configured to perform a deformation cycle to move relatively the second part member and/or the first part member to cause the specimen to be deformed and change from a first shape state to a second shape state and then back to the first shape state;
a testing apparatus main body to which the test cartridge is removably attached by a slide rail along which the first part member and/or the second part member slides; and
a state retaining part configured to fix a relative position of the second part member relative to the first part member in at least one shape state of the specimen wherein the state retaining part is removably attached to the test cartridge.

16. A deformation testing apparatus for a specimen comprising:
a first part member and a second part member which hold the specimen and in which a relative position change of the first part member and the second part member causes a deformation cycle;
a test cartridge on which the first part member and the second part member are arranged;
a testing apparatus main body to which the test cartridge is removably attached; and
a state retaining part configured to fix a relative position of the second part member relative to the first part member,
wherein the test cartridge is configured to be detachable from the testing apparatus main body during the deformation cycle in a fixed position between the second part member and the first part member, and
the thus removed test cartridge is configured to be attached back to the testing apparatus main body so as to resume the deformation cycle.

17. The deformation testing apparatus according to claim 16, wherein the deformation cycle is a cycle where the specimen is bent and stretched by a relative position change of the second part member relative to the first part member.

18. The deformation testing apparatus according to claim 17, wherein the test cartridge is configured to be attached to or removed from the testing apparatus main body by moving in a direction approximately perpendicular to a direction of bending and stretching of the specimen.

19. The deformation testing apparatus according to claim 17, wherein the first part member and/or the second part member includes a specimen supporting part rotatable around a rotation axis approximately perpendicular to a direction of bending and stretching of the specimen.

20. The deformation testing apparatus according to claim 16, comprising a plate spring held side by side with the specimen by the first part member and the second part member.

* * * * *